United States Patent [19]

Hisamune et al.

[11] Patent Number: 5,231,328

[45] Date of Patent: Jul. 27, 1993

[54] PHOSPHOR AND ULTRAVIOLET RAY EXCITED FLUORESCENT TUBE EMPLOYING IT

[75] Inventors: Takayuki Hisamune; Takashi Hase, both of Odawara, Japan

[73] Assignee: Kasei Optonix, Ltd., Tokyo, Japan

[21] Appl. No.: 899,157

[22] Filed: Jun. 15, 1992

Related U.S. Application Data

[63] Continuation of Ser. No. 584,372, Sep. 19, 1990, abandoned, which is a continuation of Ser. No. 437,340, Nov. 20, 1989, abandoned, which is a continuation of Ser. No. 209,216, Jun. 20, 1988, abandoned.

[30] Foreign Application Priority Data

Jun. 22, 1987 [JP] Japan ................................. 155076
Jun. 22, 1987 [JP] Japan ................................. 155077

[51] Int. Cl.$^5$ ........................ C09K 11/63; H01J 1/63
[52] U.S. Cl. ........................... 313/487; 252/301.4 H; 252/301.4 R; 313/486
[58] Field of Search ............... 252/301.4 H; 313/486, 313/487

[56] References Cited

U.S. PATENT DOCUMENTS 4,110,660  8/1978  Wolfe ........................... 252/301.4 R
4,128,498 12/1978  Hase et al. ................... 252/301.4 H

FOREIGN PATENT DOCUMENTS 53-147689 12/1978  Japan ........................... 252/301.4 H
55-92789   7/1980  Japan ........................... 252/301.4 H

OTHER PUBLICATIONS

Chemical Abstracts, vol. 90, No. 22, 28th May 1979, p. 716, No. 179038b, Columbus, OH, US; & JP-A-78 147 689 (Dainippon Toryo Co., Ltd) 22-12-1978 & 179037a.
Peters et al "J. Inorg. Nucl. Chem.", 1970, vol. 32, pp. 1089-1095.

Primary Examiner—Jack Cooper
Attorney, Agent, or Firm—Oblon, Spivak, McClelland, Maier & Neustadt

[57] ABSTRACT

A bivalent europium-activated alkaline earth haloborate phosphor which contains lithium as coactivator, a process for its production, and an ultraviolet ray excited fluorescent tube such as a fluorescent lamp having a fluorescent layer containing such a phosphor as the blue-emitting component.

21 Claims, 2 Drawing Sheets

PHOSPHOR AND ULTRAVIOLET RAY EXCITED FLUORESCENT TUBE EMPLOYING IT

This application is a continuation of application Ser. No. 07/584,372, filed on Sep. 19, 1990, now abandoned, which is a continuation of Ser. No. 07/437,340, filed Nov. 20, 1989, now abandoned, which is a continuation of Ser. No. 07/209,216, filed Jun. 20, 1988, now abandoned.

The present invention relates to an alkaline earth haloborate phosphor containing bivalent europium as activator, a process for its production and an ultraviolet ray excited fluorescent tube employing it. More particularly, it relates to a bivalent europium-activated alkaline earth haloborate phosphor containing lithium as coactivator and a ultraviolet ray excited high luminance fluorescent tube wherein such a phosphor is used as a blue emitting component.

As haloborate phosphors, bivalent europium-activated alkaline earth haloborate phosphors [$(M,Eu^{2+})_2B_5O_9X$ wherein M is at least one member selected from the group consisting of calcium, strontium and barium and X is at least one member selected from the group consisting of chlorine, bromine and iodine] [Journal of Inorganic Nuclear Chemistry (1970) vol. 32, 1989–1095] have been known. These bivalent europium-activated alkaline earth haloborate phosphors emit lights having a peak wavelength within a range of from about 400 to about 450 nm under excitation by ultraviolet rays, X rays, vacuum ultraviolet rays or electron beams depending upon the type of the alkaline earth metal as the matrix-constituting component. Therefore, such phosphors are expected to be useful as blue emitting phosphors for high color rendering lamps or as phosphors for lamps of copying machines, or as blue emitting phosphor components for color and black-and-white television cathode ray tubes.

On the other hand, ultraviolet ray excited fluorescent tubes such as fluorescent lamps or plasma displays, which comprise a radiation source of ultraviolet rays and a fluorescent layer capable of emitting lights under excitation by ultraviolet rays (hereinafter generally referred to simply as fluorescent lamps) have found various applications as illumination light sources or displays as a result of the developments in their processing techniques. In particular, with the advent of high color rendering fluorescent lamps, various characteristic phosphors other than conventional white-emitting halophosphate phosphors have been employed in large amounts in recent years. The fluorescent layer for such high color rendering fluorescent lamps is composed of a luminescent composition comprising blue-, green- and red-emitting phosphors. Further, in recent years, a high color rendering fluorescent lamp has been available in which a bluish green-emitting phosphor is incorporated as the fourth additive to obtain a fluorescent layer with the color temperature higher increased. The reason for employing such a luminescent composition for the fluorescent layer of high color rendering fluorescent lamps is that the color rendering value can be increased without impairing the luminous efficiency by mixing blue-, green- and red-emitting phosphors and, if necessary, a bluish green-emitting phosphor.

The blue-, green-, red- and bluish green-emitting phosphors for the fluorescent layer of high color rendering fluorescent lamps are required to have the following various properties.

1) The blue emitting phosphor has the main emission wavelength within a range of from 400 to 460 nm, preferably at about 450 nm. The green-emitting phosphor has the main emission wavelength within a range of from 510 to 560 nm, preferably at about 540 nm. The red-emitting phosphor has the main emission wavelength within a range of from 600 to 640 nm, preferably at about 610 nm. Likewise, the bluish green-emitting phosphor has the main emission wavelength within a range of from 460 to 490 nm, preferably at about 480 nm.

2) The emission luminance is high.

3) The emission luminance scarcely lowers with time, i.e. the deterioration in the emission luminance is minimum.

The following phosphors are presently practically employed for fluorescent layers of high color rendering fluorescent lamps. Namely, a bivalent europium-activated barium-magnesium aluminate phosphor (hereinafter referred to as a BAM:$Eu^{2+}$ phosphor) and alkaline earth halophosphate phosphor are used as the blue-emitting phosphors. A cerium-terbium-activated lanthanum phosphate phosphor and magnesium aluminate phosphor are used as the green-emitting phosphors. A trivalent europium-activated yttrium oxide phosphor is used as the red-emitting phosphor. Likewise, a bivalent europium-activated alkaline earth aluminate phosphor, alkaline earth halophosphate phosphor and alkaline earth borophosphate phosphor are used as the bluish green-emitting phosphors.

Among these phosphors, the blue- and green-emitting phosphors are poor in the deterioration characteristics as compared with the red-emitting phosphor and tend to lead to a color shift of fluorescent lamps with time, and an improvement in this respect is desired. Especially with the blue-emitting component of fluorescent lamps, the deterioration characteristic was the most serious problem.

Further, bivalent europium-activated chloroborate phosphors [$Ca_2B_5O_9Cl:Eu^{2+}$, $Ba_2B_5O_9Cl:Eu^{2+}$] were known as blue-emitting phosphors to be excited by ultraviolet rays. However, these phosphors had problems such that the y value in the CIE standard chromaticity coordinates was low and the luminance was low, and they were not practically useful for high color rendering fluorescent lamps. The above-mentioned Journal of Inorganic Nuclear Chemistry discloses a phosphor comprising a solid solution of the above two types of chloroborates, but such a phosphor was not practically used at all.

On the other hand, phosphors containing lithium were known. For example, US Patent 3,211,666 discloses a lanthanum phosphate phosphor containing lithium. U.S. Pat. No. 3,759,835 discloses use of a lithium compound as flux during the preparation of a rare earth oxide phosphor, and UK Patent 848,593 discloses use of a lithium compound as flux during the preparation of a magnesium borate phosphor. However, it has not been known to incorporate lithium to a bivalent europium-activated alkaline earth haloborate phosphor as in the present invention, and nothing has been known about the use of a lithium compound as flux during the preparation of such a specific phosphor or about the effects thereby obtainable.

Under the circumstances, a further improvement of the luminous efficiency has been desired for practical applications. The present inventors have conducted extensive researches to meet such demand and as a result, have found it possible to improve the luminous efficiency by incorporating lithium as coactivator to a bivalent europium-activated alkaline earth metal haloborate phosphor.

Further, it has been found possible to obtain a high emission luminance and a high luminous flux maintaining rate by a fluorescent lamp containing the above phosphor in its fluorescent layer. The present invention has been accomplished on the basis of these discoveries.

The present invention provides a bivalent europium-activated alkaline earth metal haloborate phosphor which contains lithium as coactivator.

The present invention also provides a fluorescent lamp having on its inner wall a fluorescent layer containing the above alkaline earth metal haloborate phosphor as a blue-emitting component.

Figure 1:
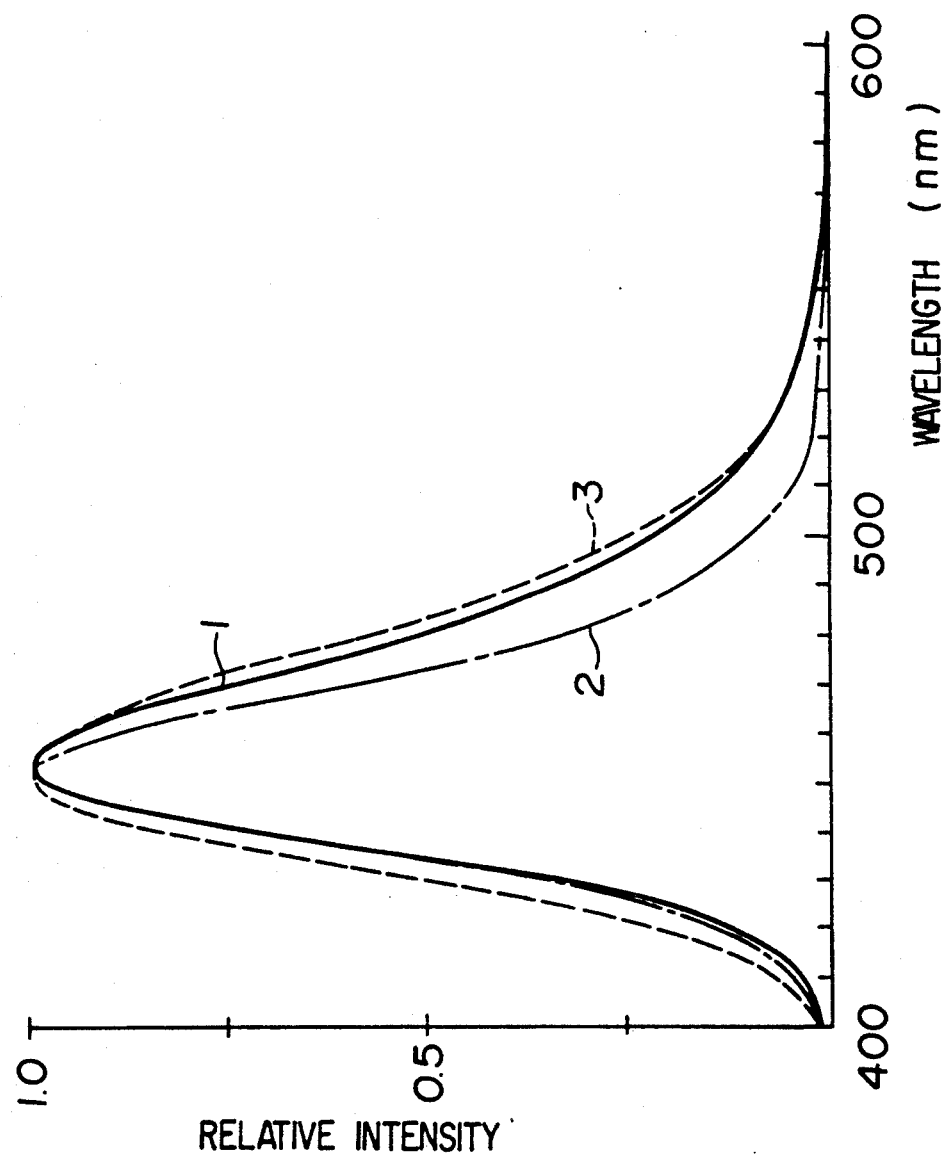
FIG. 1 shows emission spectra of fluorescent layers when excited by ultraviolet rays of 254 nm, wherein curve 1 represents the fluorescent layer of the present invention.

Now, the present invention will be described in detail.

The bivalent europium-activated alkaline earth metal haloborate phosphor as the matrix of the phosphor of the present invention may be any one of conventional materials. For example, it may be a phosphor having a composition represented by the formula:

$$M_2B_5O_9X:Eu^{2+}$$

wherein M is an alkaline earth metal (for example at least one member selected from the group consisting of calcium, strontium and barium), and X is a halogen (for example at least one member selected from the group consisting of chlorine, bromine and iodine).

In the phosphor of the present invention, the lithium content is preferably at most $5 \times 10^{-2}$ g/g, more preferably from $3 \times 10^{-6}$ g/g to $3 \times 10^{-4}$ g/g.

The present invention further includes a phosphor which is a bivalent europium-activated calcium-barium chloroborate phosphor containing lithium as coactivator, wherein the barium content is at most 50 mol % based on the total amount of calcium, europium and barium and the y value in the CIE standard chromaticity coordinates of the emission color is at least 0.06. In this phosphor, the lithium content is preferably from $1 \times 10^{-3}$ g/g to $3 \times 10^{-2}$ g/g. Such a phosphor may, for example, a chloroborate phosphor represented by the formula:

$$(Ca_{1-i-j}Ba_iEu^{2+}_j)_2B_5O_9Cl:Li \qquad (I)$$

wherein i is $0 < i \leq 0.5$, and j is $0.0005 \leq j \leq 0.25$, wherein the y value in the CIE standard chromaticity coordinates of its emission color is at least 0.06.

Further, the phosphor of the present invention includes a phosphor which contains a bivalent metal element such as Sr, Mg, Zn, Be, Sn or Pb in the phosphor of the formula I, a phosphor which contains a halogen other than chlorine, such as bromine in place of a part or whole of the chlorine in the phosphor of the formula I and a phosphor corresponding to the phosphor of the formula I wherein a part of the boron is substituted by a trivalent element other than boron, such as Al, Ga, In, Tl or Bi.

In the formula I representing the composition of one embodiment of the phosphor of the present invention, i is preferably $0.025 \leq i \leq 0.32$ particularly from the viewpoint of the emission color and the emission luminance. Likewise, the y value in the CIE standard chromaticity coordinates of its emission color is particularly preferably at least 0.065 to obtain a high level of luminance.

Now, the process for producing the phosphor of the present invention will be described.

The phosphor of the present invention can be produced by firing in a reducing atmosphere a mixture of a lithium compound and a raw material for a bivalent europium-activated alkaline earth metal haloborate phosphor. The firing is conducted usually at a temperature of from about 800° to about 980° C., preferably from 850° to 950° C. The firing is conducted once under the above condition, and may be conducted twice or more times as the case requires. As the lithium compound, for example, lithium phosphate, lithium sulfate, lithium halide, lithium borate and lithium carbonate may be used alone or in combination as a mixture of two or more.

Now, the process for producing the phosphor of the present invention will be described with reference to the phosphor represented by the above formula I. A phosphor raw material containing a calcium compound, a barium compound, a chloride, a boron compound and a europium compound, which has been prepared to satisfy the formula:

$$(Ca_{1-i-j}Ba_iEu^{2+}_j)_2B_5O_9Cl:Li \qquad (I)$$

wherein i is $0 < i \leq 0.5$, and j is $0.0005 \leq j \leq 0.25$, and a lithium compound are mixed.

As such a phosphor raw material, a mixture of the following compounds may, for example, be used.

(1) Calcium compound

Calcium oxide or a calcium-containing compound which is capable of being readily converted to calcium oxide at high temperatures, such as a nitrate or a carbonate.

(2) Barium compound

Barium oxide or a barium-containing compound capable of being readily converted to barium oxide at high temperatures, such as a nitrate or a carbonate.

(3) Chloride

Calcium chloride or barium chloride (4) Boron compound

Boron oxide or boric acid (5) Europium compound

Europium oxide or a europium compound capable of being readily converted to europium oxide at high temperatures such as a nitrate or a chloride.

The phosphor raw material containing compounds of the above five groups and the above-mentioned lithium compound are weighed, and the weighed materials are thoroughly mixed by using e.g. water as medium to obtain a paste mixture. The obtained paste mixture is dried (for example at 140° C. for 8 hours) and then sieved. The sieved mixture of phosphor raw materials is then fired in a highly reducing atmosphere. The firing in the reducing atmosphere can be conducted, for example, in the presence of carbon. More specifically, the mixture of phosphor raw materials is filled in a crucible in a layered manner, and carbon such as amorphous carbon or graphite is placed between the layers of the raw material mixture and at the top by means of quartz cloth. Then, the crucible is sealed, followed by firing. The sealing of the crucible can be made by closing the opening of the crucible with a cover by means of an adhesive such as water glass. The firing temperature is, for example, usually from about 800° to 980° C., preferably from 850° to 950° C. The firing time varies depending upon the firing temperature and the amount of the raw material mixture to be fired. However, it is usually from about 1 to 7 hours, preferably from 2 to 5 hours.

By conducting the firing under the above-mentioned condition, the interior of the crucible will be a reducing atmosphere by the presence of carbon. The reducing atmosphere may better be maintained by keeping the exterior atmosphere to be neutral or to be a reducing atmosphere.

As a method for forming the reducing atmosphere, reference has been made to a method wherein carbon is present. However, the firing may be conducted under a condition where a similar reducing atmosphere can be formed, for example, in a hydrogen atmosphere containing steam.

After the firing, various operations which are commonly employed for the preparation of phosphors, such as washing, drying and sieving, are conducted to obtain the phosphor of the present invention.

In the production of a phosphor, it is common in many cases to add a flux to the phosphor raw materials for the purpose of improving the emission luminance or powder properties of the phosphor thereby obtained. Also in the production of the phosphor of the present invention, ammonium chloride or a chloride of the phosphor raw material (3) may be used as flux. When the chloride of the phosphor raw material (3) is used as flux, the chloride of the phosphor raw material (3) is used in an amount in excess of the amount which satisfies the formula for the composition of the above mixture. Further, an excess amount of the material (4) may sometimes be used as flux.

As mentioned above, to the phosphor of the formula I of the present invention, a bivalent element and/or a trivalent element may further be incorporated in order to improve the properties such as luminance. As such elements, strontium, magnesium and zinc may be mentioned. At least one of these elements may preferably be incorporated in the phosphor. It is particularly preferred to incorporate strontium with a view to increasing the y value.

In particular, in the case of a fluorescent lamp having on its inner wall a fluorescent layer containing as a blue-emitting component a chloroborate phosphor containing bivalent europium as main activator and having a basic composition represented by the formula:

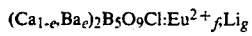

$(Ca_{1-e}Ba_e)_2B_5O_9Cl:Eu^{2+}{}_f, Li_g$ wherein e, f and g are numbers which satisfy $0 \leqq e \leqq 0.7$, $0.001 \leqq f \leqq 0.5$ and $0 < g \leqq 0.1$, respectively, the chloroborate phosphor is prepared by firing a phosphor raw material comprising a calcium compound (such as calcium oxide, calcium nitrate or calcium carbonate), a barium compound (such as barium oxide, barium nitrate or barium carbonate), a chloride (such as calcium chloride or barium chloride), a boron compound (such as boron oxide or boric acid), a europium compound (such as europium oxide, europium nitrate or europium chloride) and a lithium compound (such as lithium phosphate, lithium sulfate, lithium halide, lithium borate or lithium carbonate) to satisfy the formula of the above composition, in a highly reducing atmosphere (e.g. in a gas atmosphere containing carbon in a high concentration) at a temperature of from 800° to 1100° C., followed by various usual steps such as washing, drying and sieving.

In accordance with a conventional method, the above chloroborate phosphor is formed into a phosphor slurry and coated on an inner surface of a glass tube to obtain a fluorescent lamp. The fluorescent lamp of the present invention thus prepared exhibits excellent blue-emission and has a good luminous flux maintaining rate. FIG. 1 is a graph showing emission spectra of blue-emitting phosphors to be used for fluorescent lamps, when the phosphor of the present invention and conventional phosphors were excited by ultraviolet rays. In FIG. 1, curve 1 represents a $(Ca_{0.95},Ba_{0.05})_2B_5O_9Cl:Eu^{2+}{}_{0.063},Li_{0.0025}$ phosphor used in the present invention, curve 2 represents a $Ca_2B_5O_9Cl:Eu^{2+}{}_{0.063}$ phosphor (hereinafter referred to as a CCB phosphor) which is conventional but not practically used, and curve 3 represents a $BAM:Eu^{2+}$ phosphor which is most excellent in the performance among phosphors presently available and is practically used. As is evident from FIG. 1, the phosphor used in the present invention has an emission spectrum very close to the spectrum of the $BAM:Eu^{2+}$ phosphor, but the width of the emission spectrum is narrower than that of the $BAM:Eu^{2+}$ phosphor. With respect to the emission luminance and the emission color of each phosphor, the phosphor of curve 1 used in the present invention has a luminance of 153% and (x, y) = (0.144, 0.075), the conventional phosphor of curve 2 has a luminance of 100% and (x, y) = (0.146, 0.047), and the conventional phosphor of curve 3 has a luminance of 152% and (x, y) = (0.144, 0.074). It is evident from these results that the phosphor used in the present invention is similar in the emission color to the conventional $BAM:Eu^{2+}$ phosphor which is practically used and has a higher emission luminance. The conventional CCB phosphor is substantially inferior in the luminance to the other two phosphors.

Figure 2:
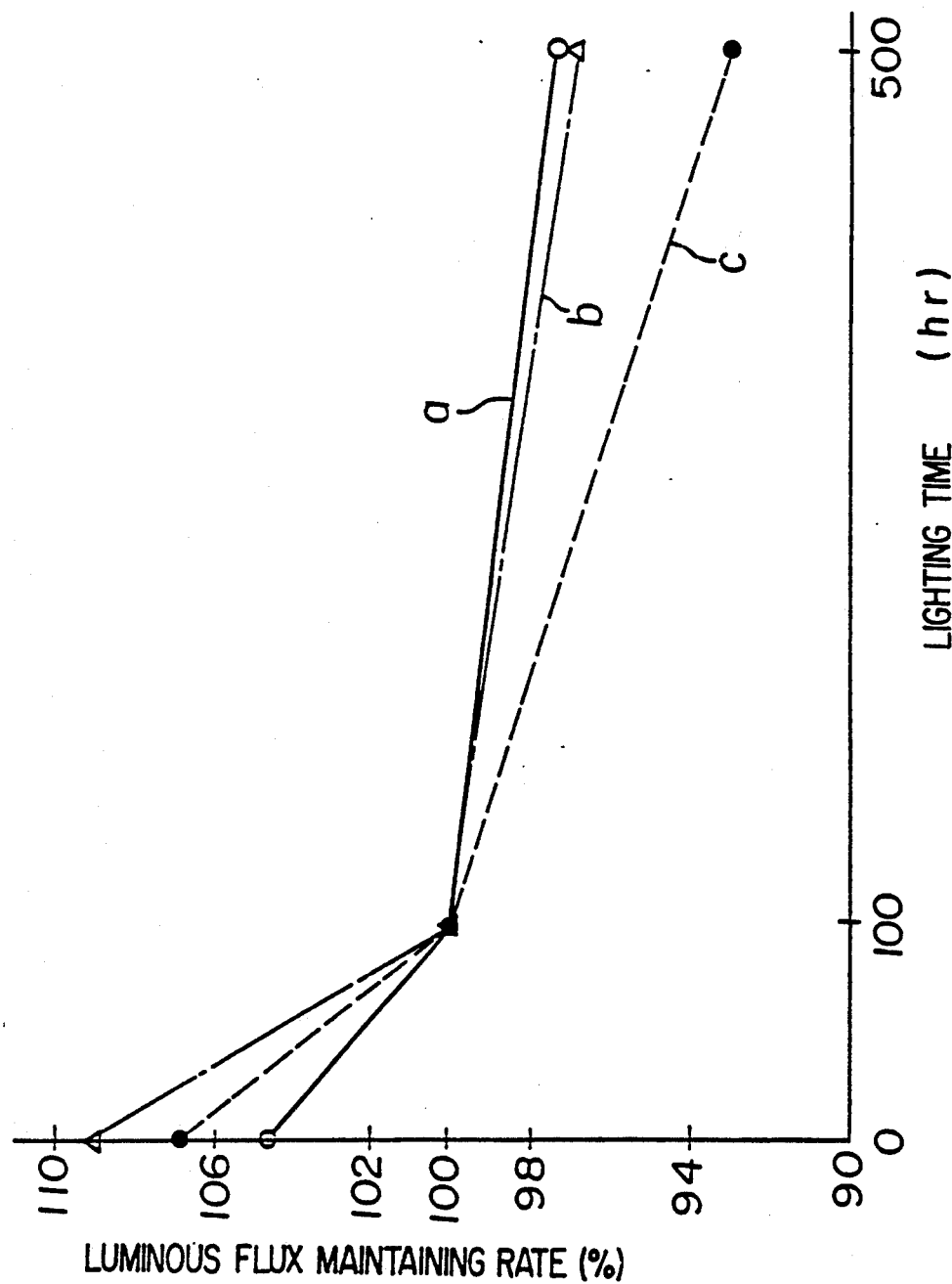
FIG. 2 is a graph showing the relation between the lighting time and the luminous flux maintaining rate of fluorescent lamps, wherein curve a represents the fluorescent lamp of the present invention.

FIG. 2 is a graph showing the luminous flux deterioration characteristics of 40W slim line lamps having fluorescent layers composed respectively of the above three types of phosphors only. In FIG. 2, curve a shows the luminous flux deterioration characteristic of the fluorescent lamp of the present invention wherein the phosphor of which the emission spectrum is shown by curve 1 in FIG. 1 was used, curve b shows the luminous flux deterioration characteristic of the fluorescent lamp wherein the conventional phosphor represented by curve 2 in FIG. 1 was used, and curve c shows the luminous flux deterioration characteristic of the fluorescent lamp wherein the conventional phosphor practically used represented by curve 3 in FIG. 1 was used. In FIG. 2, the luminous flux deterioration characteristics of the fluorescent lamps are presented by a manner commonly employed by those skilled in the art i.e. by plotting luminous flux values relative to the luminous flux value upon expiration of a lighting time of 100 hours being 100%. As is evident from FIG. 2, the fluorescent lamp of the present invention is excellent in the initial luminous flux deterioration characteristic as well as in the subsequent luminous flux maintaining rate, as compared with the fluorescent lamp wherein the practically employed conventional $BAM:Eu^{2+}$ phosphor was used. Further, the initial luminous flux deterioration characteristic is excellent also as compared with the fluorescent lamp in which the conventional CCB phosphor was used. As described in the foregoing, the fluorescent lamp of the present invention shows excellent initial luminous flux deterioration characteristics and extremely high luminous flux maintaining rate over a long period of time. Such excellent results are attributable to the use of the specific phosphor having the basic composition as represented by the foregoing formula among chloroborate phosphors which used to be not practically employed. Especially with respect to the emission color, the effectiveness is remarkable particularly when a part of calcium is substituted by barium as shown by the above formula of ($Ca_{1-e},Ba_e$). From this point of view, the e value is usually $0<e\leq 0.7$, preferably $0<e\leq 0.5$, more preferably $0.025\leq e\leq 0.32$. Further, when the e value is specified in this manner and the phosphor is produced in the above-mentioned manner, the y value in the CIE standard chromaticity coordinates of the emission color of the phosphor will be substantially higher than the conventional value. Namely, the y value is at least 0.06 within a range of $0<e\leq 0.5$, and the y value is at least 0.065 within a range of $0.025\leq e\leq 0.32$. On the other hand, from the view point of e.g. luminance, the effect is improved by the incorporation of lithium. From this viewpoint, the g value is selected within a range of from $0<g\leq 0.1$, preferably $0<g\leq 0.05$, more preferably $0.001\leq g\leq 0.03$.

Particularly when a part of calcium is substituted by barium, the content of lithium is increased. In the fluorescent lamp of the present invention, remarkably good effects are obtainable when a part of calcium is substituted by barium and lithium is incorporated in the above-mentioned composition of the phosphor to be used.

The reason why the formula for the composition of the phosphor in the present invention is a formula of a basic composition is that within a range not to impair the effects of the above phosphor, the bivalent metal elements in the phosphor may partially be substituted by other bivalent metal elements (such as Sr. Mg, Zn, Be, Sn and Pb), a part of the chlorine may be substituted by other halogen such as bromine, or a part of the boron may be substituted by other trivalent element (such as Al, Ga, In, Tl or Bi) to impart additional properties or to improve the effects. Further, within a range not to impair the above basic composition, other rare earth elements, etc. may be incorporated in very small amounts as activators or coactivators to the phosphor.

The above described fluorescent lamp of the present invention is preferably practically employed as a high color rendering fluorescent lamp. In such a fluorescent lamp, the above-mentioned specific alkaline earth chloroborate phosphor may be the sole blue-emitting component. Otherwise, a blue-emitting phosphor having the main emission wavelength within a range of from 400 to 460 nm may be substituted for less than 50% by weight of the above-mentioned alkaline earth chloroborate phosphor. As such a blue-emitting phosphor, at least one member selected from the group consisting of an alkaline earth aluminate phosphor containing bivalent europium as main activator, an alkaline earth halophosphate phosphor containing bivalent europium as main activator, an alkaline earth borophosphate phosphor containing bivalent europium as main activator and an alkaline earth silicate phosphor containing bivalent europium as main phosphor, is recommended. It is possible to obtain a high rendering fluorescent lamp of the present invention by incorporating in the fluorescent layer from 5 to 35 by weight of the above-mentioned blue-emitting phosphor having the main emission wavelength within a range of from 400 to 460 nm, and additionally from 0 to 35% by weight of a bluish green-emitting phosphor having the main emission wavelength within a range of from 460 to 490 nm, from 30 to 65% by weight of a green-emitting phosphor having the main emission wavelength within a range of from 500 to 560 nm and from 15 to 45% by weight of a red-emitting phosphor having the main emission wavelength within a range of from 600 to 640 nm. For example, as the above bluish green-, green- and red-emitting phosphors, the above-mentioned conventional phosphors may respectively be used. However, it is particularly recommended that as the green-emitting phosphor, lanthanum phosphate phosphor containing cerium and terbium as main activators or a phosphor composed mainly of such lanthanum phosphate phosphor is used, and as the red-emitting phosphor, a rare earth metal oxide phosphor containing trivalent europium as main activator or a phosphor composed mainly of such a rare earth metal oxide phosphor is used. Further, an alkaline earth sulfate or an alkaline earth aluminate may preferably be fused (to such an extent that not all is converted to a solid solution) or mixed to at least one of the above phosphors so that the cost can thereby be substantially reduced.

The high color rendering fluorescent lamp of the present invention can be prepared in the same manner as the conventional fluorescent lamp except that the above-mentioned novel phosphor mixture is used for the fluorescent layer.

Now, the present invention will be described in further detail with reference to Examples. However, it should be understood that the present invention is by no means restricted by such specific Examples.

EXAMPLE 1

| Calcium carbonate | $CaCO_3$ | 100 g |
| Calcium chloride | $CaCl_2.2H_2O$ | 77 g |
| Boron oxide | $B_2O_3$ | 123 g |
| Europium oxide | $Eu_2O_3$ | 8.4 g |
| Lithium phosphate | $Li_3PO_4$ | 9.1 g |

To the above phosphor raw material, water was added to form a paste which was then thoroughly mixed. The mixture thus obtained was dried and pulverized in a mortar. Then, it was filled in an alumina crucible and fired at a temperature of 900° C. for two hours in a reducing atmosphere. After the firing, the fired product was pulverized, washed a few times with warm water, dried and then sieved. The phosphor thus obtained contained 100 ppm of Li and showed a blue luminescence of a high color purity under excitation by ultraviolet rays, vacuum ultraviolet rays, X-rays or electron beams. This phosphor showed the same spectrum as that of the phosphor prepared in the same manner as in Example 1 except that no lithium phosphate was used, and the emission efficiency was higher by as much as 6%.

EXAMPLE 21

| Calcium carbonate | $CaCO_3$ | 100 g |
| Calcium chloride | $CaCl_2.2H_2O$ | 77 g |
| Boron oxide | $B_2O_3$ | 123 g |
| Europium oxide | $Eu_2O_3$ | 8.4 g |

| -continued | | |
|---|---|---|
| Lithium sulfate | $Li_2SO_4 \cdot H_2O$ | 1.51 g |

The above phosphor raw material was treated in the same manner as in Example 1 to obtain a phosphor, which contained 30 ppm of Li and had an emission efficiency higher by as much as 8% than that of the phosphor obtained without using lithium sulfate.

EXAMPLE 3

| Calcium carbonate | $CaCO_3$ | 100 g |
|---|---|---|
| Calcium chloride | $CaCl_2 \cdot 2H_2O$ | 77 g |
| Boron oxide | $B_2O_3$ | 123 g |
| Europium oxide | $Eu_2O_3$ | 8.4 g |
| Lithium chloride | LiCl | 20 g |

The above phosphor raw material was treated in the same manner as in Example 1 to obtain a phosphor, which contained 56 ppm of Li and had an emission efficiency higher by as much as 16% than that of the phosphor obtained without using lithium chloride.

EXAMPLE 4

| Calcium carbonate | $CaCO_3$ | 100 g |
|---|---|---|
| Calcium chloride | $CaCl_2 \cdot 2H_2O$ | 77 g |
| Boron oxide | $B_2O_3$ | 130 g |
| Europium oxide | $Eu_2O_3$ | 8.4 g |
| Lithium sulfate | $Li_2SO_4 \cdot H_2O$ | 0.3 g |

The above phosphor raw material was treated in the same manner as in Example 1 to obtain a phosphor, which contained 7 ppm of Li and had an emission efficiency higher by as much as 2% than that of a phosphor obtained without using lithium sulfate.

EXAMPLE 5

| Calcium carbonate | $CaCO_3$ | 100 g |
|---|---|---|
| Barium chloride | $BaCl_2 \cdot 2H_2O$ | 298 g |
| Boron oxide | $B_2O_3$ | 190 g |
| Europium oxide | $Eu_2O_3$ | 10.9 g |
| Lithium chloride | LiCl | 14.6 g |

The above phosphor raw material was treated in the same manner as in Example 1 to obtain a phosphor, which contained 20,000 ppm of lithium and had an emission efficiency higher by as much as 12% than that of a phosphor obtained without using lithium chloride.

EXAMPLE 6

| Calcium carbonate | $CaCO_3$ | 100 g |
|---|---|---|
| Calcium chloride | $CaCl_2 \cdot 2H_2O$ | 45.3 g |
| Barium chloride | $BaCl_2 \cdot 2H_2O$ | 52 g |
| Boron oxide | $B_2O_3$ | 130 g |
| Europium oxide | $Eu_2O_3$ | 6.7 g |
| Lithium chloride | LiCl | 10 g |

The above phosphor raw material was treated in the same manner as in Example 1 to obtain a phosphor, which contained 10,000 ppm of lithium and had an emission efficiency higher by as much as 8% than that of a phosphor obtained without using lithium chloride.

EXAMPLE 7

A phosphor raw material comprising calcium carbonate ($CaCO_3$), calcium chloride ($CaCl_2 \cdot 2H_2O$), boron oxide ($B_2O_3$), europium oxide ($Eu_2O_3$) and lithium phosphate ($Li_3PO_4$) was mixed with water as medium to obtain a paste, which was thoroughly mixed. The mixture thus obtained was dried at 140° C. for 6 hours and sieved with a screen of 150 mesh. Then, ⅔ of the sieved raw material was put in a crucible, carbon enveloped with quartz cloth was placed thereon, and the remaining ⅓ of the raw material was put thereon. Further, carbon enveloped with a quartz cloth was placed thereon and a cover was put thereon. The space between the crucible and the cover was sealed with water glass. This crucible was fired at a temperature of 900° C. for two hours. After the firing, the fired product was pulverized, washed a few times with warm water, dried and then sieved. The phosphor thus obtained was found to have a composition represented by the formula:

$$(Ca_{0.95},Ba_{0.05})_2B_5O_9Cl:Eu^{2+}{}_{0.063},Li_{0.0025}$$

as a result of the analysis.

A 40W slim line lamp having a fluorescent layer made of a mixture comprising 15% by weight of the above phosphor, 40% by weight of a $Y_2O_3$:Eu phosphor and 45% by weight of a $LaPO_4$:Ce,Tb phosphor, was prepared by a usual method. This fluorescent lamp of the present invention had an average color rendering value of 84 and an emission efficiency of 72 lm/W.

As compared with a fluorescent lamp prepared in the same manner by using a $Ca_2B_5O_9Cl:Eu^{2+}{}_{0.063}$ phosphor instead of the above chloroborate phosphor (average color rending value: 80, emission efficiency: 70 lm/W), the fluorescent lamp of the present invention exhibited excellent performance. Further, with the fluorescent lamp of the present invention, the luminous flux maintaining rate after lighting for a long period of time was high and the color shift was little.

EXAMPLE 8

A 40W slim line lamp having a fluorescent layer made of a mixture comprising 10% by weight of a $(Ca_{0.7},Ba_{0.3})_2B_5O_9Cl:Eu^{2+}{}_{0.06}Li_{0.001}$ phosphor prepared in the same manner as in Example 7, 15% by weight of a $2(Sr,Ba,Eu^{2+})O \cdot 0.84P_2O_5 \cdot 0.16B_2O_3$ phosphor, 30% by weight of a $Y_2O_3$:Eu phosphor and 45% by weight of a $LaPO_4$:Ce,Tb phosphor, was prepared by a usual method. This fluorescent lamp of the present invention had an average color rendering value of 87 and an emission efficiency of 65 lm/W.

As compared with a fluorescent lamp prepared in the same manner by using a $Ca_2B_5O_9Cl:Eu^{2+}{}_{0.06}$ phosphor instead of the above chloroborate phosphor (average color rendering value: 85, emission efficiency: 64 lm/W), the fluorescent lamp of the present invention exhibited excellent performance. With the fluorescent lamp of the present invention, the luminous flux maintaining rate after lighting for a long period of time was high, and the color shift was little.

EXAMPLE 9

A 40W slim line lamp having a fluorescent layer made of a mixture of comprising 20% by weight of a $(Ca_{0.85},Ba_{0.15})_2B_5O_9Cl:Eu^{2+}{}_{0.10}Li_{0.01}$ phosphor prepared in the same manner as in Example 7, 40% by weight of a $Y_2O_3$:Eu phosphor and 40% by weight of a (Ce,Tb)MgAl$_{11}$O$_{19}$ phosphor, was prepared by a usual method. This fluorescent lamp of the present invention had an average color rendering value of 83 and an emission efficiency of 70 lm/W.

As compared with a fluorescent lamp prepared in the same manner by using a Ca$_2$B$_5$O$_9$Cl:Eu$^{2+}$$_{0.10}$ phosphor instead of the above chloroborate phosphor (average color rendering value: 82, emission efficiency: 69 lm/W), the fluorescent lamp of the present invention exhibited excellent performance. With the fluorescent lamp of the present invention, the luminous flux maintaining rate after lighting for a long period of time was high, and the color shift was little.

EXAMPLE 10

A 40W slim line lamp having a fluorescent layer made of a mixture comprising 20% by weight of a (Ca$_{0.9}$Ba$_{0.1}$)$_2$B$_5$O$_9$Cl:Eu$^{2+}$$_{0.10}$ phosphor prepared in the same manner as in Example 7, 45% by weight of LaPO$_4$:Ce,Tb phosphor and 35% by weight of a Y$_2$O$_3$:Eu phosphor, was prepared by a usual method. This fluorescent lamp of the present invention had an average color rendering value of 2 and an emission efficiency of 70 lm/W.

As compared with a fluorescent lamp prepared in the same manner by using a Ca$_2$B$_5$O$_9$Cl:Eu$^{2+}$$_{0.10}$ phosphor instead of the above chloroborate phosphor (average color rendering value: 80, emission efficiency: 70 lm/W), the fluorescent lamp of the present invention exhibited excellent performance. With the fluorescent lamp of the present invention, the luminous flux maintaining rate after lighting for a long period of time was high, and the color shift was little.

The phosphor of the present invention has a high emission efficiency as compared with conventional bivalent europium-activated alkaline earth haloborate phosphors and thus is useful as a blue-emitting phosphor for high color rendering lamps, as a phosphor for copying machines and lamps or as a blue-emitting component phosphor for television cathode ray tubes.

Further, the fluorescent lamp of the present invention contains a highly luminescent excellent blue-emitting component and is useful particularly for a high color rendering fluorescent lamp wherein the white luminous flux and the luminous flux maintaining rate are improved.

We claim:

1. A bivalent europium-activated alkaline earth haloborate phosphor which contains an amount of lithium effective as coactivator to improve its luminous efficiency, said phosphor having the formula M$_2$B$_5$O$_9$X:Eu$^{2+}$ wherein M is calcium, strontium, barium or mixtures thereof and X is chlorine, bromine or iodine.

2. The phosphor according to claim 1, wherein the lithium content is at most $5 \times 10^{-2}$ g/g.

3. The phosphor according to claim 1, wherein the lithium content is within a range of from $3 \times 10^{-6}$ g/g to $3 \times 10^{-4}$ g/g.

4. The phosphor according to claim 1, which contains calcium and barium as alkaline earth and chlorine as halogen.

5. The phosphor according to claim 4, wherein the lithium content is within a range of from $1 \times 10^{-3}$ g/g to $3 \times 10^{-2}$ g/g.

6. The phosphor according to claim 1, having the formula:

$$(Ca_{1-i-j}Ba_iEu_j^{2+})_2B_5O_9X:Li$$

wherein i is $0 < i \leq 0.5$, and j is $0.0005 \leq j \leq 0.25$, and X is chlorine, bromine or iodine.

7. The phosphor of claim 6, wherein X is chlorine.

8. The phosphor according to claim 6, wherein i is $0.025 \leq i \leq 0.32$.

9. The phosphor according to claim 1, having the formula:

$$(Ca_{1-e}Ba_e)_2B_5O_9Cl:Eu^{2+}_fLi_g$$

wherein e, f and g are numbers which satisfy $0 \leq e \leq 0.7$, $0.001 \leq f \leq 0.5$ and $0 < g \leq 0.1$, respectively.

10. An ultraviolet ray excited fluorescent tube having on its inner wall a fluorescent layer containing as a blue-emitting component a bivalent europium-activated alkaline earth haloborate phosphor which contains an amount of lithium effective as coactivator to improve its luminous efficiency, said phosphor having the formula M$_2$B$_5$O$_9$X:Eu$^{2+}$ wherein M is calcium, strontium, barium or mixtures thereof and X is chlorine, bromine or iodine.

11. An ultraviolet ray excited fluorescent tube comprising on its inner wall a fluorescent layer comprising a blue-emitting component a phosphor according to claim 1 having a basic composition represented by the formula:

$$(Ca_{1-e}Ba_e)_2B_5O_9Cl:Eu^{2+}_fLi_g$$

wherein e, f and g are numbers which satisfy $0 \leq e \leq 0.7$, $0.001 \leq f \leq 0.5$ and $0 < g \leq 0.1$, respectively.

12. The ultraviolet ray excited fluorescent tube according to claim 11, wherein the blue-emitting component is composed of a blue-emitting phosphor having the main emission wavelength within a range of from 400 to 460 nm, and the content of said basic composition is at least 50% by weight in the blue-emitting component.

13. The ultraviolet ray excited fluorescent tube according to claim 12, wherein the blue-emitting phosphor is at least one phosphor selected from the group consisting of an alkaline earth aluminate phosphor containing bivalent europium as main activator, an alkaline earth halophosphate phosphor containing bivalent europium as main activator, an alkaline earth borophosphate phosphor containing bivalent europium as main activator and an alkaline earth silicate phosphor containing bivalent europium as main activator.

14. The ultraviolet ray excited fluorescent tube according to claim 11, wherein the fluorescent layer comprises from 5 to 35% by weight of said basic composition having the main emission wavelength within a range of from 400 to 460 nm, from 0 to 35% by weight of a bluish green-emitting phosphor having the main emission wavelength within a range of from 460 to 490 nm, from 30 to 65% by weight of a green-emitting phosphor having the main emission wavelength within a range of from 500 to 560 nm and from 15 to 45% by weight of a red-emitting phosphor having the main emission wavelength within a range of from 600 to 640 nm.

15. The ultraviolet ray excited fluorescent tube according to claim 14, wherein the bluish green-emitting phosphor is at least one phosphor selected from the group consisting of an alkaline earth aluminate phosphor containing bivalent europium as main activator, an alkaline earth halophosphate phosphor containing bivalent europium as main activator, an alkaline earth borophosphate phosphor containing bivalent europium as main activator and an alkaline earth aluminate phosphor containing bivalent europium and manganese as main activators.

16. The ultraviolet ray excited fluorescent tube according to claim 14, wherein the green-emitting phosphor is at least one phosphor selected from the group consisting of a lanthanum phosphate phosphor containing cerium and terbium as main activators, an alkaline earth borate phosphor containing cerium and terbium as main activators, an alkaline earth aluminate phosphor containing cerium and terbium as main activators and a rare earth silicate phosphor containing cerium and terbium as main activators.

17. The ultraviolet ray excited fluorescent tube according to claim 14, wherein the red-emitting phosphor is at least one phosphor selected from the group consisting of a rare earth oxide phosphor containing trivalent europium as main activator, a rare earth oxysulfide phosphor containing trivalent europium as main activator, a rare earth vanadate phosphor containing trivalent europium as main activator and a rare earth phosphovanadate containing trivalent europium as main activator.

18. The ultraviolet ray excited fluorescent tube according to claim 11, wherein the e value of the chloroborate phosphor is within range of $0<e\leq0.5$ and the y value in the CIE standard chromaticity coordinates of the emitted color of the chloroborate phosphor is at least 0.06.

19. The ultraviolet ray excited fluorescent tube according to claim 18, wherein the e value is within a range of $0.025\leq e\leq0.32$, and the y value is at least 0.065.

20. The ultraviolet ray excited fluorescent tube according to claim 11, wherein the g value is within a range of $0<g\leq0.05$.

21. The ultraviolet ray excited fluorescent tube according to claim 20, wherein the value is within a range of from $0.001\leq g\leq0.03$.

* * * * *